United States Patent
Yamamoto

[15] 3,691,527
[45] Sept. 12, 1972

[54] CREDIT CARD ACTUATED VENDING MACHINE SYSTEM

[72] Inventor: Mititaka Yamamoto, Kyoto, Japan

[73] Assignee: Tateisi Electronics Co., Kyoto-shi, Japan

[22] Filed: April 6, 1970

[21] Appl. No.: 26,095

Related U.S. Application Data

[63] Continuation of Ser. No. 563,158, July 6, 1966, abandoned.

[52] U.S. Cl. ..........................340/149 A, 340/147 LP
[51] Int. Cl. ................................................H04q 9/00
[58] Field of Search................340/147, 149, 147 LP; 235/61.6, 61.7 B; 179/2 CA

[56] References Cited
UNITED STATES PATENTS

| | | |
|---|---|---|
| 3,121,159 | 2/1964 | Rogal........................235/61.6 |
| 3,184,714 | 5/1965 | Brown, Jr. et al. ........340/149 |
| 3,308,238 | 3/1967 | Brothman et al........179/2 CA |
| 3,355,576 | 11/1967 | Childers et al............235/61.7 |
| 3,394,246 | 7/1968 | Goldman ...........340/149 A X |
| 3,440,606 | 4/1969 | Bayha....................340/149 A |

*Primary Examiner*—Donald J. Yusko
*Attorney*—Kurt Kelman

[57] ABSTRACT

Apparatus for checking whether a credit card inserted into a vending machine is valid and, additionally, assigning priority of operation of the vending machine to owners of credit cards, based on the order of insertion of the credit cards into the machine.

1 Claim, 4 Drawing Figures

CREDIT CARD ACTUATED VENDING MACHINE SYSTEM

This is a continuation of my copending application Ser. No. 563,158, filed July 6, 1966, now abandoned.

The present invention relates to an article dispensing apparatus which provides an article or a service controlled by using a credit card.

Vending apparatus combining a checking means to check the validity of a credit card inserted into the apparatus, a reading means to read out a customer number on the credit card, a vending machine to be driven by the insertion of the valid credit card, and a recording means to record the selling price of the sold article and the customer number is known.

In such apparatus, it is necessary for the apparatus to be equipped with a recording means capable of recording the number of articles that have been sold to any customer. This information is needed to determine the total cost of the items purchased. The recording means, in recording the selling information, converts the selling information into a particular code which can be recorded on a recording medium (for example, a tape). However, the recording means is expensive to manufacture and, therefore, it is desirable to use one recording means in common with a number of vending machines.

An example of an invalid credit card which may be inserted into a vending machine is as follows:

1. A spurious credit card;
2. A credit card having a defective customer number thereon;
3. A credit card reported as lost; or
4. A credit card which has expired.

When a customer inserts an invalid credit card into the vending machine, no sale should take place. Therefore, it is desirable for the vending machine to check whether each credit card inserted into the machine is valid or invalid.

Under ideal conditions, each vending machine would be associated with its own checking means. However, the checking means checking a credit card for the defects identified in the above items (2) and (3) is comparatively complicated and, therefore, a single checking means is usually shared in common with a number of vending machines.

During peak periods, simultaneous or overlapping use of two or more vending machines may result in the checking means either receiving inaccurate information, the misdirecting of information from the checking means to the vending machines, or the recording of incomplete or inaccurate information of the sale.

Therefore, it is an object of the present invention to provide an article dispensing apparatus in which each vending machine and the common control device thereof are reliable in operation, even if all machines are operated nearly simultaneously or overlapping in the time.

For a fuller understanding of the nature and objects of the present invention, reference should be had to the following detailed description, taken in conjunction with the accompanying drawing, in which.

Figure 2:
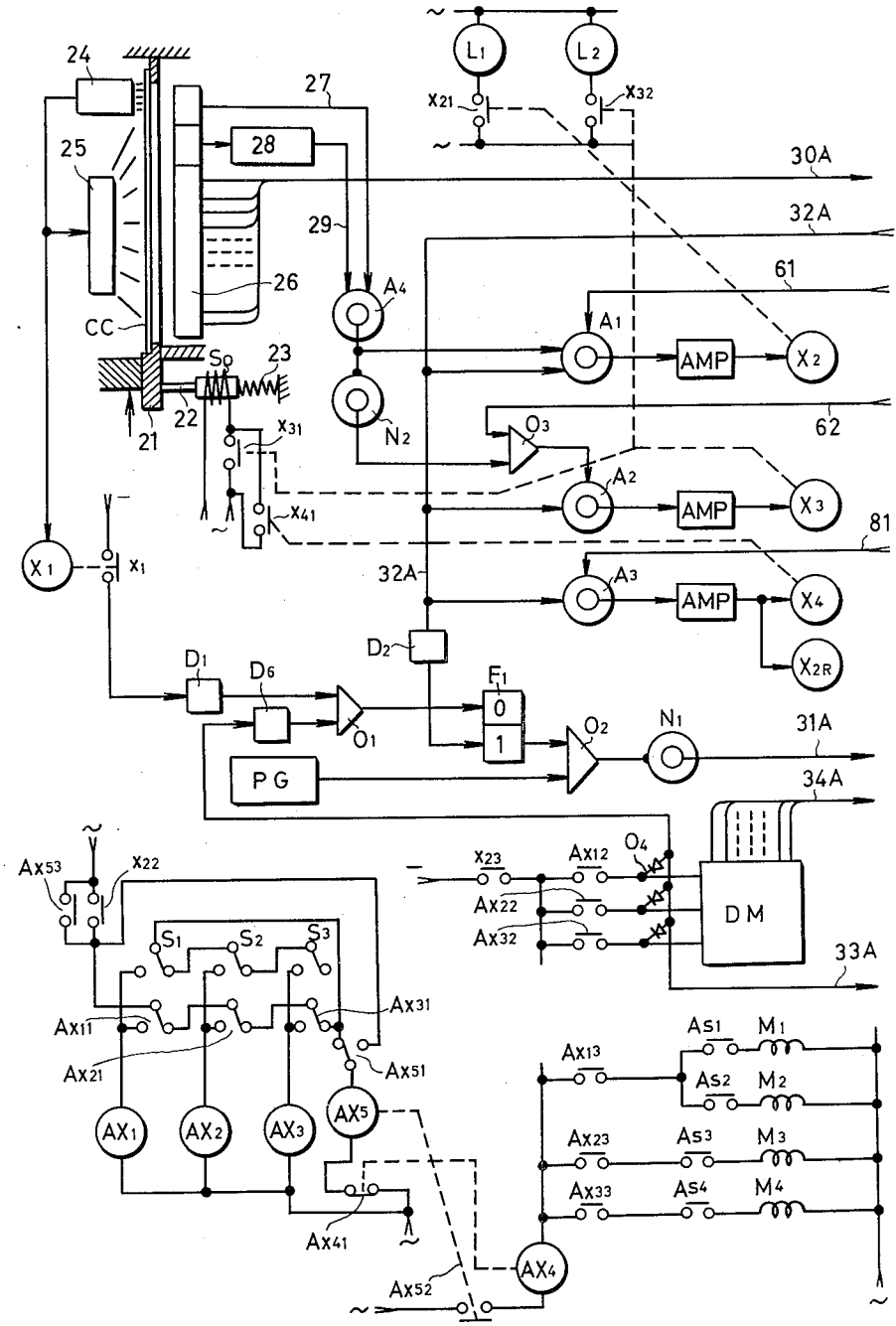
FIG. 2 is a schematic diagram of a checking means and a control means equipped in each vending machine in accordance with the present invention.

An embodiment of the present invention will be described in detail hereinafter. The illustrated embodiment is an article dispensing apparatus comprising a recording control means R and three article vending machines A, B and C connected thereto. A checking means 2 in the machine A is constructed as follows. When a credit card CC on a tray 21 is inserted completely, a lock-pin 22 acting against spring 23 will lock tray 21 in position. This condition is illustrated in FIG. 2. In this condition a sensor or proximity switch 24 senses for the presence of a specific metal laid on embedded within the credit card CC to check the validity of the inserted credit card, the metal being magnetic or non-magnetic, a poor or good conductor, and the like. When the proximity switch detects the presence of the specific metal, the proximity switch drives a relay X, and lights a light source 25. The light emitted from light source 25 illuminates photo-electric elements 26 through coded transparent portions of the available term and the customer number on the credit card CC. Additionally, the light penetrates a transparent portion disposed on the credit card CC to check the correct position of the credit card CC. If the credit card CC is located in the correct position, the light illuminates one unit of the photo-electric elements and thereby the one unit of the photo-electric elements supplies a signal indicating that the credit card position is correct (OK) on a line 27. When a checking portion 28 checks or confirms the available term of the credit card OK, checking portion 28 supplies a signal on a line 29. The output from the remainder of the photo-electric elements is supplied as a customer number signal to a pre-selector switch 5 described hereinafter through lines 30A through 30C.

A control means 3 is constructed as follows. contact $x_1$ of the relay $X_1$ operated by the output of sensor 24 supplies a signal to a flip-flop circuit (hereinafter called "F circuit") $F_1$ through a differential circuit $D_1$ and an OR circuit $0_1$ so as to reverse the operating condition of the F circuit $F_1$. This reverse of the operating condition of the F circuit $F_1$ provides no output on "1" side output terminal thereof. Therefore, a pulse from continuously operating pulse signal generator PG will be transmitted to a NOT circuit $N_1$ through an OR circuit $0_2$. The OR circuit $0_2$ supplies the pulse signal as a calling signal on a line 31A. When the pulse signal from the OR circuit $O_1$ is fed to a pre-selector means 4 described hereinafter, the F circuit $F_1$ will be re-reversed to stop further calling signal by a first arrival of a signal which has been returned from pre-selector means 4. A first arrival signal line 32A is connected to the input terminals of AND circuits $A_1$, $A_2$ and $A_3$ and a differential circuit $D_2$ so as to reverse the F circuit $F_1$ again as described above. The AND circuit $A_1$ receives an input from the AND circuit $A_4$, the first arrival signal 32A, and an input signal on line 61 which indicates that the customer number signal through the line 30A has been checked and found to be correct by an invalid number storage 7 and a complete number signal checker 6. On the other hand, the AND circuit $A_2$ receives, as an input thereof, a signal from a NOT circuit $N_2$ and a signal on line 62. This indicates that the customer number is incorrect. Thus, when the inserted credit card is located in the correct position, has not expired and bears a complete and valid registered customer number, and moreover when the calling signal from the machine is received by pre-selector means 4 and is returned therefrom as the first arrival signal 32A, the AND circuit $A_1$ supplies an output signal which drives a keep relay $X_2^-$ to close contacts $x_{21}$, $x_{22}$ and $x_{23}$ thereof. Operation of contacts $x_{21}$, $x_{22}$ and $x_{23}$ lights a lamp $L_1$ which indicates that the inserted credit card is valid and urges the associated vending machine to its selling condition.

On the other hand, when the inserted credit card is invalid, a relay $X_3$ operates to close a contact $x_{31}$ and energize a solenoid So. This urges lock-pin 22 to move against the action of the spring and permits the inserted credit card to fall out. At the same time, a lamp $L_2$ which is used to indicate that the inserted credit card has been found to be invalid will be lighted. The explanation above refers to that situation where vending machine A is being used. However, the same explanation applies to the use of vending machines B or C.

Figure 3:
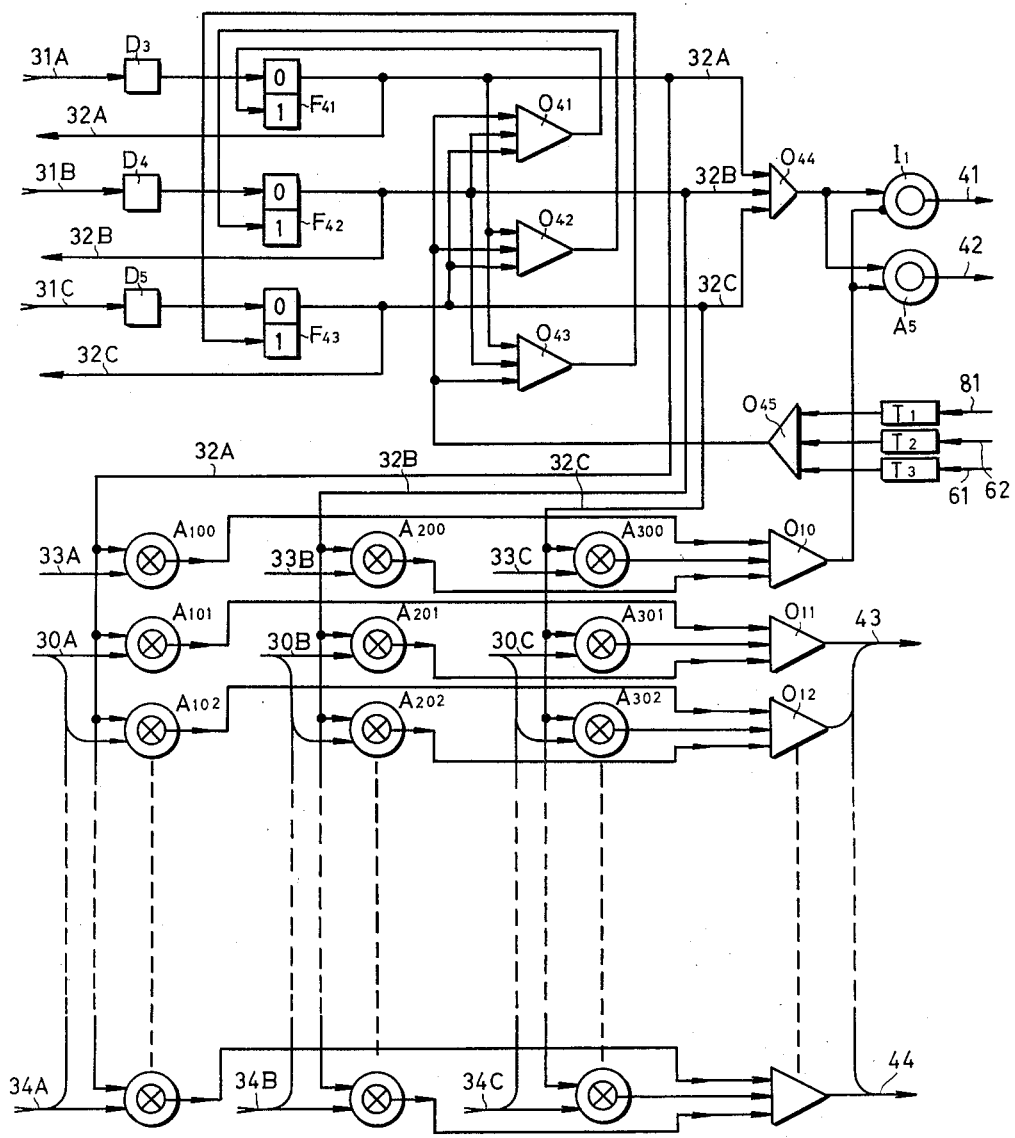
FIG. 3 is a block diagram of a pre-selector means and a pre-selector switch shown in FIG. 1.
Figure 4:
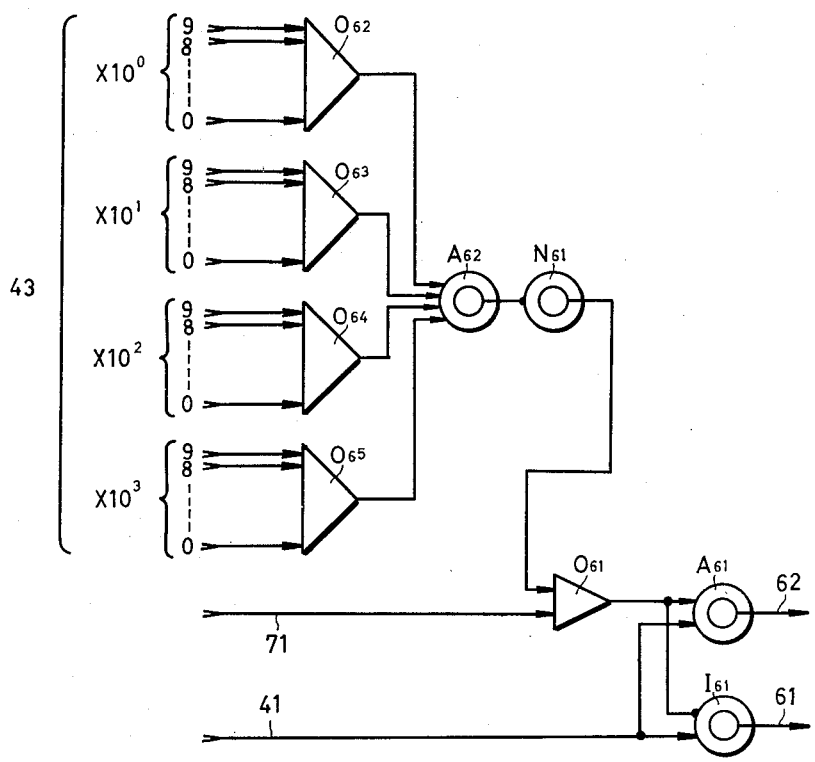
FIG. 4 is a block diagram of the customer number checker and the invalid number storage shown in FIG. 1.

The following explanation refers to pre-selector means 4 (FIG. 3). $F_{41}$, $F_{42}$ and $F_{43}$ are flip-flop circuits which can be positioned in the vending machines A, B and C, respectively. The set input sides of the F circuits $F_{41}$, $F_{42}$ and $F_{43}$ are respectively connected to the calling pulse input lines 31A, 31B and 31C from the machine corresponding thereto. A differential circuit $D_3$, $D_4$ and $D_5$ in each line differentiates the calling pulse from the machine before it is fed to the set input side of the F circuit. Pre-selector means 4 is provided with OR circuits $0_{41}$, $0_{42}$ and $0_{43}$ which operates when a calling pulse signal is present on the calling pulse input lines 31A through 31C to set one of the F circuits $F_{41}$, $F_{42}$ and $F_{43}$ which receives the first one of the calling pulse signals and locks the remainder of the F circuits. When one of the F circuits is operated by the receipt of a calling pulse signal, the F circuit will supply a first occurring signal from its output terminal to the corresponding one of lines 32A, 32B and 32C. The signal lines 32A, 32B and 32C connect to the machines A, B and C, respectively, and connect to a pre-selector switch means 5.

Pre-selector switch means 5 comprises three groups of AND gates where each group corresponds to machines A, B and C, respectively. That is, the first group of the AND circuits $A_{100}$, $A_{101}$, $A_{102}$ . . . corresponds to the machine A, the second group of the AND circuit $A_{200}$, $A_{201}$, $A_{202}$. . . corresponds to the machine B, and the remainder group corresponds to the machine C. The first stage of each group of AND circuits $A_{100}$, $A_{200}$ and $A_{300}$ is connected respectively to input lines 33A, 33B and 33C to which an input is applied when the operation of the selling price selection occurs in the corresponding one of machines A, B and C. The remainder of the stages of the AND circuits of each group are respectively connected to customer number signal lines 30A, 30B and 30C, and selling price signal lines 34A, 34B and 34C which correspond to the machines A, B and C, respectively. First occurring signal lines 32A, 32B and 32C are respectively connected to one of the input terminals of the AND circuits in each AND circuit group corresponding to each of the first arrival signal line.

The corresponding stage of each group of an AND circuit group, for example AND circuits $A_{100}$, $A_{200}$ and $A_{300}$, AND circuits $A_{101}$, $A_{201}$ and $A_{301}$, AND circuits $A_{102}$, $A_{202}$ and $A_{302}$, provides an output thereof to OR circuits $0_{10}$, $O_{11}$ and $0_{12}$.

When one of the F circuits $F_{41}$ through $F_{43}$ receives the calling signal from the machine to provide the first occurring signal, the group of AND circuits which corresponds to the machine will be opened by receiving the first occurring signal to provide a customer number signal for the customer who has driven the machine to the OR circuits $0_{11}$, $0_{12}$ . . . For instance, if a calling signal from the machine A is the first occurring one, only one group of AND circuit $A_{100}$, $A_{101}$ . . . will be open and a customer number signal of that customer will appear at the OR circuits $0_{11}$, $0_{12}$ . . . The output of the OR circuit $0_{10}$ is a signal indicating the selling price of the article selected by the customer in the machine. In accordance with this embodiment, the present invention is provided with an inhibit circuit $I_1$ and an AND circuit $A_5$ which are connected to the output terminal of the OR circuit $0_{44}$ and the output terminal of the OR circuit $0_{10}$. The inhibit circuit $I_1$ supplies the check signal 41 of the customer number if the OR circuit $0_{10}$ does not provide a signal indicating the selling price of the article selected by the customer. On the other hand, when the OR circuit $0_{10}$ supplies an output signal, both the output signal from the OR circuit $0_{10}$ and the first occurring signal through the OR circuit $0_{44}$ enables the AND circuit $A_5$ to supply a record starting output signal 42. Further, it is noted that the first arrival signal is eliminated when OR circuits $0_{41}$ through $0_{43}$ receives a signal from an OR circuit 45 to supply a reset input to the F circuits $F_{41}$ through $F_{43}$, respectively. In other words, the first occurring signal is eliminated when an OK signal 61 or a not OK signal 62 for the inserted credit card is received from the checking means when the customer number is checked, or the occurrence of a record finishing signal 81 which indicates the completion of the recording operation from a timer $T_1$, $T_2$ or $T_3$, respectively so as to make any of the timers above time up.

A customer number signal from the pre-select switch means 5 is transmitted to an invalid number storage means 7 and the checking means which includes a checking portion 6 to check whether the customer number has complete figures or not. If the customer number signal of the customer number on the inserted credit card should be the same as an invalid signal stored in invalid number storage means 7, invalid number storage means 7 will provide an invalid signal 71 to an AND circuit $A_{61}$ through an OR circuit $O_{61}$. On the other hand, the first occurring signal of the credit card, which has been inserted into the machine, is supplied to the inhibit circuit $I_1$, and therefore output signal 41 of the inhibit circuit is provided to the AND circuit $A_{61}$ so as to supply an invalid signal 62 therefrom. It is noted in this case that an inhibit circuit $I_{61}$ does not provide a signal 61 when the output signal 41 of inhibit circuit $I_1$ is fed to the inhibit circuit $I_{61}$.

Further, it is also noted that the checking portion which checks whether the customer number has complete figures or not supplies four inputs to an AND circuit $A_{62}$ through four OR circuits $0_{62}$ through $0_{65}$ which corresponds to each of the four figures of customer number signal 43 and the AND circuit $A_{62}$ will not provide an output signal if a digit of the customer number is lacking. The output signal of a NOT circuit $N_{61}$ fed by the AND circuit $A_{62}$ and the invalid signal 71 are supplied to an OR circuit $0_{61}$, which supplies an invalid output signal 62 indicating the credit card not to be valid. When there are no inputs to the OR circuit $0_{61}$, the OR circuit $0_{61}$ will not supply an output signal and the inhibit circuit $I_{61}$ will supply a valid output 61 indicating the credit card to be OK.

The operation of the selling price selection in the machine is illustrated in FIG. 2. When all the read-out information from the credit card inserted into the machine is adequately satisfied with the predetermined conditions as described hereinabove and the first arrival signal returns to the vending machines, a keep relay $X_2$ will be energized to close the relay contacts $x_{22}$ and $X_{23}$ so that the operating condition of the machine may be continued even if the first occurring signal has terminated. The operation of relay contacts $x_{22}$ and $x_{23}$ energizes a relay $AX_5$ to close the relay contacts $Ax_{51}$, $Ax_{52}$ and $Ax_{53}$. Therefore, the machine is kept in the condition for a selling operation. Then, when one of a various kind of the selling price switches $S_1$, $S_2$ and $S_3$ is pushed, for example the selling price switch $S_1$ is pushed, a relay $AX_1$ will be energized to keep the self-contact $AX_{11}$ and make contacts $Ax_{12}$ and $Ax_{13}$ closed.

When the contact $Ax_{12}$ is closed, a digitalized selling price signal 34 corresponding to the selling price switch driven by the customer is transmitted from a diode matrix circuit DM to pre-selector switching means 5. Furthermore, a signal 33A which is used to start the recording operation is also transmitted to the pre-selector switching means 5. However, the actual recording operation has not been started yet. A signal through an OR circuit $0_4$ from a differential circuit $D_6$ and the OR circuit $0_1$ operates to reverse the operation of the F circuit $F_1$, together with a signal from a pulse generator PG is transmitted as calling signal 31A to the pre-selector switching means 5. In this case, if there is no first occurring signal from another machine, first occurring signal 32A will be transmitted by the calling signal 31A, so that the first occurring signal 32A may open the AND gates $A_{100}$, $A_{101}$ ... in the preselector switch portion to transmit customer number signal 30A which had been provided and selling price signal 34A described above to recording means 8 and, a the same time, to transmit a record starting signal 42 through the OR circuit $0_{10}$ and AND circuit $A_5$ to recording means 8. The recording means starts to record the selling price and the customer. At the completion of the recording operation, recording means 8 supplies a record end signal 81. Record end signal 81 is supplied to each one of the machines A, B and C. However, as only the machine A has received the first arrival signal, an AND gate $A_3$ in the machine A provides an output to drive a relay $X_4$ and a release electric magnet $X_2R$ of a keep relay $X_2$. Thereby the keep relay $X_2$ will be restored and a solenoid $S_0$ will be energized by closing of a contact $x_{41}$ so as to drop tray 21 containing the credit card. Then, when the customer closes the selection switch $AS_1$ or $AS_2$ corresponding to the article selected previously, an article releasing solenoid $M_1$ or $M_2$ will be operated to release the article. At the same time, a relay $AX_4$ is driven to open contact $AX_{41}$ thereof momentarily and the self-holding of relay $AX_5$ will be released to return the machine to the initial condition. Moreover, relay contacts $Ax_{11}$, $Ax_{21}$, $Ax_{31}$ and $Ax_{51}$ are released to assume their normal positions.

Now, assuming that a valid credit card is inserted correctly into the machines A and B nearly simultaneously and a calling pulse signal 31A is transmitted from machine A a little earlier than from machine B. It is noted in this case that first occurring signal 32A is supplied to only the machine A, that calling pulse signal 31A is eliminated and that such a signal as first occurring signal 32A does not appear at machine B. By virtue of first arrival signal 32A, only the customer number signal from machine A is admitted to pass selecting switch means 5 to be checked in check means 6 and signal 61, which indicates that the customer number on the credit card is correct, is fed to pre-selector means 4 and machine A. Then, machine A will be set ready for the selling operation and first occurring signal 32A is eliminated in selector means 4. At the instant of eliminating first occurring signal 32A, valid card indicating signal 61, checking order signal 41 and the output of OR circuit $0_{45}$ are also eliminated and pre-selector means 4 is returned to the initial condition thereof. Then, a calling signal from machine B producers another first occurring signal 32B and first occurring signal 32B eliminates the calling signal of machine B. Furthermore, first occurring signal 32B opens a gate circuit corresponding to machine B in pre-selector switch means 5 so as to pass the customer number signal from machine B to check means 6, in which the customer number signal is checked whether the signal is valid or not. When a valid signal as to the customer number is provided to pre-selector switch means 5 and machine B, as described above, pre-selector means 4 will be returned to the initial condition thereof. Subsequently, when the operation of selecting the price of the article is performed nearly simultaneously in machines A and B, one of the calling signals from machines A and B is transmitted with priority to the other one. As illustrated in detail above, if in the pre-selector means the calling signal from machine A has priority to that from machine B, signals as to the price of the selected article and the customer number from machine A are recorded first of all and then the first occurring signal of machine A will be eliminated. And thereafter, the calling signal from machine B is automatically processed and thereby signals as to the price of the selected article and customer number from machine B are also recorded.

When the calling pulse signals from the machines sequentially reach pre-selector means 4 in machines A, B and C, the calling signals from machine A obtain the first occurring signal and that the first occurring signal eliminates the calling signal. However, when the elimination of the calling signals from machine A is performed after information processing operations (the customer number checking operation or the recording operation) with respect to machine A, machine B will not always obtain the first occurring signal. In others words, the elimination of the calling signal means the time when a reset pulse is provided to F circuit $F_{41}$ and then the lock conditions of F circuit $F_{42}$ and $F_{43}$ are released, and in this case calling pulse signals 31B and 31C are compared again with each other with respect to the first arrival. Both calling signals 31B and 31C are in the form of pulse wave, and the first arrival is decided by which calling signal 31B or 31C first reverses the operation of the F circuit. Accordingly, when three calling signals occur simultaneously, the first of the two calling signals to arrive is decided substantially by the arrival order of the calling pulses, irrespective of the timing order of the insertion of the credit cards and the timing order of the selection of the article price. If the calling signals are not in the form of a pulse train (continuous pulse wave) and the calling operation is performed at three places, the first occurring signal of the first machine can be obtained. However, it is difficult to determine the first occurring signal if the two remaining calling signals on and after the second arrival after the first occurring calling signal of the first machine is eliminated, because there must be simultaneous inputs at the F circuits $F_{41}$, $F_{42}$ and $F_{43}$ corresponding to the remaining calling signals. Therefore, in order to determine the first occurring signal it is necessary for the F circuits to stop one of the remaining calling signals for a short time. Accordingly, it is noted that if the calling signals are in the form of pulse train, the first occurring signal of the remaining calling signals can be obtained because there is always provided a timing deviation between the inputs of the F circuits.

Figure 1:
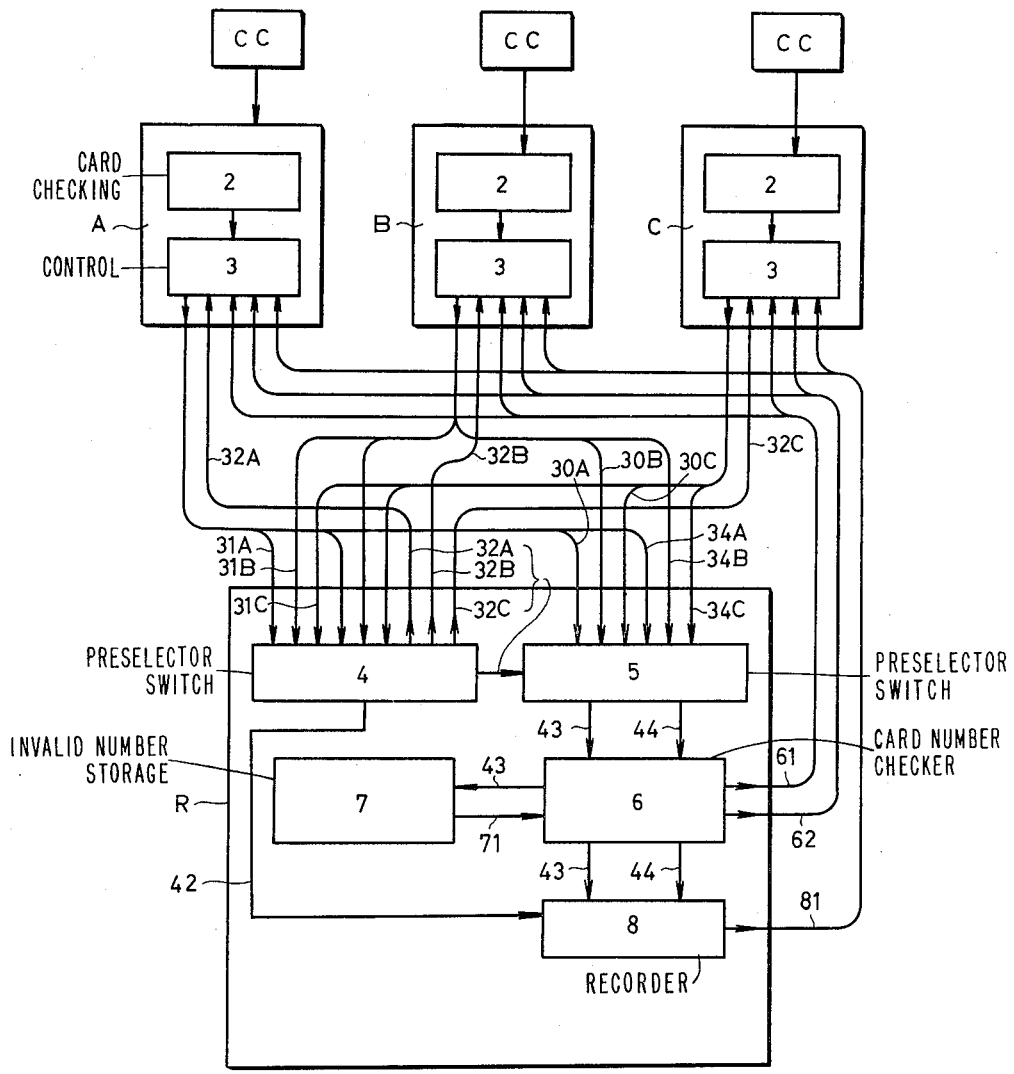
FIG. 1 is a block diagram of a vending apparatus in accordance with the present invention.

If the machine deals only in a unit price article, the present apparatus shown in FIG. 1 needs only one price recording operation which can be obtained by short circuiting contacts $Ax_{12}$, $Ax_{22}$ and $Ax_{32}$ in the circuit shown in FIG. 2. In this case, contact $x_{23}$ of relay $X_2$ is closed by the receipt of a valid card signal 61 during the insertion of the credit card and, therefore, the recording of the article price and the customer number is completed prior to the receipt of the first occurring signal.

This present invention can be easily applied to a service vending apparatus, for example, an automatic ticket punching machine. Such an automatic ticket punching machine is similar to the unit price goods vending machine, the machine being constructed to open a ticket punching gate under the control of relay $X_4$ when this relay is driven.

I claim:

1. In an article vending system of the type that includes a plurality of remote vending machines operable by the insertion of a credit card therein, each vending machine being connected to a central recording station for recording the identity of the purchaser and the amount of the purchase made from each machine the improvement which comprises circuitry to inhibit the simultaneous connection of more than one remote vending machine to the recording means in said central recording station, said circuitry including:

a. at each remote vending machine;
  means, responsive to the presence of specific indicia on said credit card, for checking the validity of said card and for generating a first signal if said card is valid;
  a pulse generator;
  a first bi-stable device, having a "set" input, a "reset" input and an output, said "set" input being connected to said checking means to receive said first signal; and
  gating means, actuated by the output of said first bistable device, for gating the output of said pulse generator to said central recording station as a calling signal; and b. at the central recording station;
  a second bistable device, for each one of said plurality of remote vending machines, each device having a "set" input of the associated bistable device;
  an OR-gate for each one of said plurality of remote vending machines, said OR-gate having an output, and as many inputs as there are remote vending machines connected to the system, said second bistable devices and said OR-gates being grouped in pairs, the output of each second bistable device being connected to the inputs of all of said OR-gates other than the OR-gate associated therewith in the same pair, the output of each OR-gate being connected to the "reset" input of the second bistable device associated therewith in the same pair, the output of each second bistable device being transmitted back as a second signal to the "reset" input of the first bistable device in the associated remote vending machine to reset same and terminate transmission of said first signal, the calling signal from the remote vending machine which first arrives changing the state of its associated second bistable device and inhibiting a change of state in all other second bistable devices, and even in the presence of calling signals from other remote vending machines; and
  a plurality of AND-gates, arranged in groups, one group for each remote vending machine, having their inputs connected to the signal outputs from the associated remote vending machines and to the output of the associated second bistable device so that only that group of AND-gates associated with the second bistable device receiving the first-arriving calling signal is operable to gate the output of the corresponding vending machine to said recording means, whereby simultaneous connection of more than one vending machine to said recording means is inhibited.

* * * * *